United States Patent
Moore et al.

(10) Patent No.: US 6,328,345 B1
(45) Date of Patent: Dec. 11, 2001

(54) SECONDARY TUBING CONTAINMENT SYSTEM FOR A METERING PUMP

(75) Inventors: John C. Moore, Boylston; Kevin Moran, Leominster, both of MA (US)

(73) Assignee: Liquid Metronics, Inc., Acton, MA (US)

( * ) Notice: Subject to any disclaimer, the term of this patent is extended or adjusted under 35 U.S.C. 154(b) by 0 days.

(21) Appl. No.: 09/492,597

(22) Filed: Jan. 27, 2000

(51) Int. Cl.⁷ ................................................ F16L 11/12
(52) U.S. Cl. ................... 285/123.1; 285/123.15; 285/13; 285/302; 285/343
(58) Field of Search ................... 285/13, 123.1, 285/123.15, 123.17, 302, 342, 343, 354

(56) References Cited

U.S. PATENT DOCUMENTS

| | | | |
|---|---|---|---|
| 3,861,719 | * | 1/1975 | Hand .............................. 285/123.1 X |
| 4,005,880 | * | 2/1977 | Anderson et al. .......... 285/123.12 X |
| 4,871,196 | * | 10/1989 | Kingsford ......................... 285/123.1 |
| 5,088,774 | * | 2/1992 | Spiegelman ...................... 285/123.1 |
| 5,401,064 | * | 3/1995 | Guest ................................. 285/123.1 |
| 5,498,036 | * | 3/1996 | Kingsford ......................... 285/123.1 |
| 5,681,063 | * | 10/1997 | Bressner ........................ 285/123.1 X |
| 6,129,107 | * | 10/2000 | Jackson ......................... 285/123.1 X |
| 6,237,963 | * | 5/2001 | Hall ............................. 285/123.15 X |

* cited by examiner

*Primary Examiner*—J. J. Swann
*Assistant Examiner*—F. Zeender

(57) ABSTRACT

A secondary tubing containment system (10) is provided for a discharge tube (18) of a chemical metering pump (14) in a chemical addition system (12). One end of the discharge tube (18) is engaged in a fitting (20) on the metering pump (14), and the other end of the discharge tube (18) is engaged in a fitting (22). The containment system (10) includes a pair of coupling nuts (30, 32), a connector in the form of a Tee (34), two cylindrical tubes (36, 38), a pair of unions (40, 42), and a drain tube (44). The inside and outside diameters of the tubes (36, 38) are sized to allow the tube (38) to be slid or telescoped into the tube (36) to allow the length of the containment system (10) to be adjusted. The union (40) is configured to sealingly engage the tube (38) along the length of the tube (38) to accommodate the adjustment. This allows the containment system (10) to accommodate different lengths of discharge tube (18), as dictated by the particular chemical addition system (12) to which the containment system (10) is being assembled.

10 Claims, 2 Drawing Sheets

SECONDARY TUBING CONTAINMENT SYSTEM FOR A METERING PUMP

FIELD OF THE INVENTION

This invention relates to secondary tubing containment for metering pump discharge tubes.

BACKGROUND OF THE INVENTION

Chemical metering pumps are used to add metered amounts of chemicals to chemical feed systems used in a variety of applications such as potable water treatment, wastewater treatment, swimming pools, plating processes, mining operations, car washes, boilers, and cooling towers. In such applications, it is common for the metering pump to be mounted to a supply tank containing the fluid that is pumped by the metering pump. A discharge tube extends from an outlet fitting of the metering pump to an injector fitting that injects the metered fluid from the metering pump into a chemical feed manifold or flow conduit where the metered fluid is mixed with other fluids in the process. Some localities require that secondary tubing containment be provided for the discharge tubing of the metering pumps to prevent harmful leaks of the metered fluid should the discharge tubing rupture. One approach to providing the secondary tubing containment is to cut a containment tube to the exact length required to extend over the length of the discharge tube. While this approach may be acceptable for its intended purpose, because the length of the discharge tube will vary depending upon the particular configuration of the application, the approach requires custom fitting to obtain the desired containment and can be difficult to assemble.

SUMMARY OF THE INVENTION

It is a principal object of the invention to provide a new and improved secondary tubing containment system for use with a discharge tube of a metering pump. It is another object of the invention to provide a secondary tubing containment system that is adaptable to a number of different configurations of metering pumps and discharge tubes. More specifically, it is an object of the invention to provide a secondary tubing containment system that is adjustable in length to adapt to various lengths of discharge tubes.

In accordance with one form of the invention, a containment system is provided for use with a discharge tube of a metering pump. The discharge tube has a first end engaged in a first fitting on the metering pump and a second end engaged in a second fitting. The containment system includes a first coupling nut, a connector, a first length of tubing, a first union, a second length of tubing, a second union, and a second coupling nut. The first coupling nut is configured to sealingly engage the first end of the discharge tube in the first fitting. The first coupling nut has an opening sized to allow the discharge tube to extend therethrough to engage the first fitting. The connector has third and fourth fittings sized to allow the discharge tube to extend therethrough. The third fitting is configured to sealingly engage a portion of the first coupling nut. The connector also includes a drain port. The first length of tubing has third and fourth ends and is sized to allow the discharge tube to extend therethrough. The third end is configured to be sealingly engaged in the fourth fitting. The first union has sixth and seventh fittings sized to allow the discharge tube to extend therethrough. The sixth fitting is configured to sealingly engage the fourth end. The seventh fitting is a compression type fitting. The second length of tubing has fifth and sixth ends and is sized to allow the discharge tube to extend therethrough. The fifth end of the second length of tubing is sized to extend through the sixth and seventh fittings and into the first length of tubing. The second length of tubing is sized to be sealingly engaged in the seventh fitting. The second union has eighth and ninth fittings sized to allow the discharge tube to extend therethrough. The eighth fitting is configured to sealingly engage the sixth end of the second length of tubing. The second coupling nut is configured to sealingly engage the second end of the discharge tube in the second fitting. The second coupling nut has a portion configured to be sealingly engaged in the ninth fitting.

In one form of the invention, the third and ninth fittings are of the compression type, the first coupling nut includes a cylindrical body sized to be sealingly engaged in the third fitting, and the second coupling nut includes a cylindrical body sized to be sealingly engaged in the ninth fitting .

In another form of the invention, the third, fourth, sixth, eighth and ninth fittings are of the compression type.

In yet another form of the invention, the connector is a Tee connector and the drain port is a compression type fitting, and the containment system further includes a drain tube having an end sized to be sealingly engaged in the drain port.

Other objects, features and advantages of the invention will be apparent from the following detailed description taken in conjunction with the accompanying drawings, the above summary, and the appended claims.

DETAILED DESCRIPTION OF THE PREFERRED EMBODIMENTS

Figure 1:
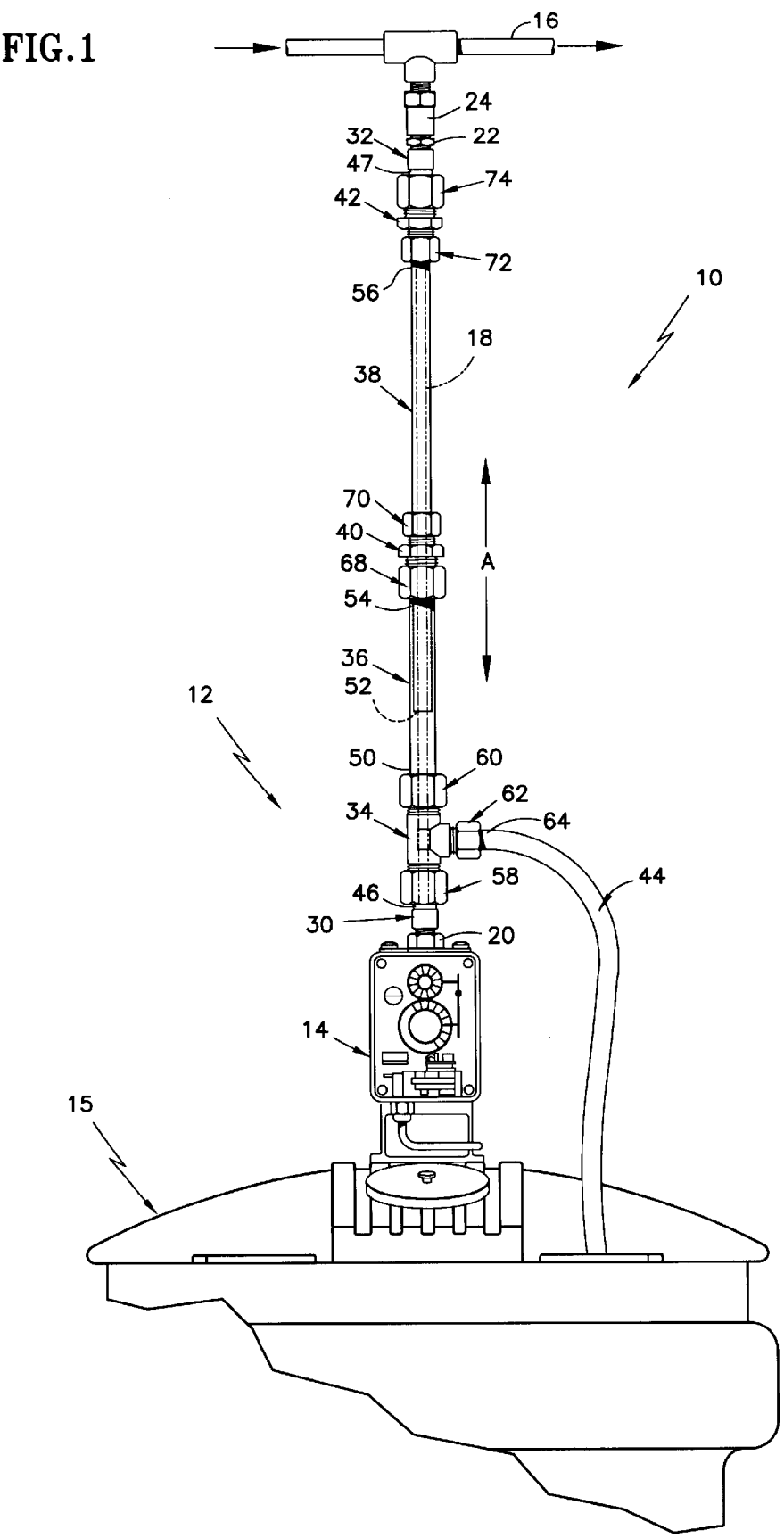
FIG. 1 is a front elevation of a chemical addition system including a metering pump and utilizing a secondary tubing containment system embodying the present invention.

Exemplary embodiments of a secondary tubing containment system 10 are illustrated in the drawings in connection with a chemical addition system 12 including a metering pump 14 that injects metered fluid from a supply tank 15 to a chemical feed conduit or manifold 16 through a discharge tube 18 (shown in phantom in FIG. 1). The Series A/B/C, Series P, Series E7, Series 9, and Series J5 metering pumps currently offered by Liquid Metronics, Inc. located in Acton, Mass. are examples of metering pumps that are commonly used in systems such as the system 12. One end of the discharge tube 18 is engaged in a fitting 20 on the metering pump 14, and the other end of the discharge tube 18 is engaged in a fitting 22 connected to an injector 24 that injects the metered fluid into the chemical feed conduit 16. It should be understood that the invention may find utility with other forms of chemical addition systems 12 utilizing other types and configurations of metering pumps, chemical feed conduits, fluid supplies, fittings, etc. By way of example, but without limitation, the supply tank 15 could be replaced by a supply conduit. Similarly, the chemical feed conduit 16 and the injector 24 could be spaced horizontally from the metering pump 14, rather than vertically. Accordingly, no limitation to use with a specific form of chemical addition system 12 is intended except in so far as expressly stated in the appended claims.

With reference to FIG. 1, the containment system 10 includes a pair of coupling nuts 30 and 32, a connector in the form of a Tee 34, two cylindrical tubes 36 and 38, a pair of unions 40 and 42, and a drain tube 44. The inside and outside diameters of the tubes 36 and 38 are sized to allow the tube 38 to be slid or telescoped into the tube 36 to allow the length of the containment system 10 to be adjusted, as shown by arrows A in FIG. 1. The union 40 is configured to sealingly engage the tube 38 anywhere along the length of the tube 38 to accommodate the length adjustment. This allows the containment system to accommodate different lengths of discharge tube 18, as dictated by the particular chemical addition system 12 to which the containment system 10 is being assembled.

In the illustrated embodiment, the coupling nuts 30 and 32 and their connection to the fittings 20 and 22 are identical. The coupling nuts 30 and 32 have cylindrical bodies 46 and 47, respectively, that extend away from their respective fittings 20 and 22. Cylindrical openings 48 and 49 (hidden in FIG. 1) extend through the coupling nuts 30 and 32, respectively, to allow the ends of the discharge tube 18 to be engaged in their respective fittings 20 and 22.

The tubes 36 and 38 have first ends 50 and 52, and second ends 54 and 56 respectively. The Tee 34 has three fittings 58, 60 and 62. The fittings 58 and 60 are sized to allow the discharge tube 18 to pass therethrough when the Tee 34 is in the assembled state. The fitting 58 is configured to sealingly engage the cylindrical body 46 of the coupling nut 30 to restrict leakage of the metered fluid from the containment system 10. The fitting 60 is configured to sealingly engage the end 50 of the tube 36 to restrict leakage of the metered fluid from the containment system 10. The fitting 62 functions as a drain port for the containment system 10 and is configured to sealingly engage an end 64 of the drain tube 44 to restrict leakage of the metered fluid from the containment system 10.

The union 40 includes a pair of fittings 68 and 70 that are sized to allow the discharge tube 18 to pass therethrough when the union 40 is in the assembled state. The fitting 68 is configured to sealingly engage the end 54 of the tube 36. The fitting 70 is of the compression type and, as previously discussed, is configured to sealingly engage the tube 38 along the length of the tube 38 to restricting leakage of the metered fluid from the containment system 10 while accommodating adjustment of the length of the containment system 10 via the telescoping of the tube 38 in the tube 36.

The union 42 includes a pair of fittings 72 and 74 that are sized to allow the discharge tube 18 to pass therethrough when the union 42 is in the assembled state. The union 72 is configured to sealingly engage the end 56 of the tube 38 to restrict leakage of the metered fluid from the containment system 10. The fitting 74 is configured to sealingly engage the cylindrical body 48 of the coupling nut 32 to restrict leakage of the metered fluid from the containment system 10.

Figure 2:
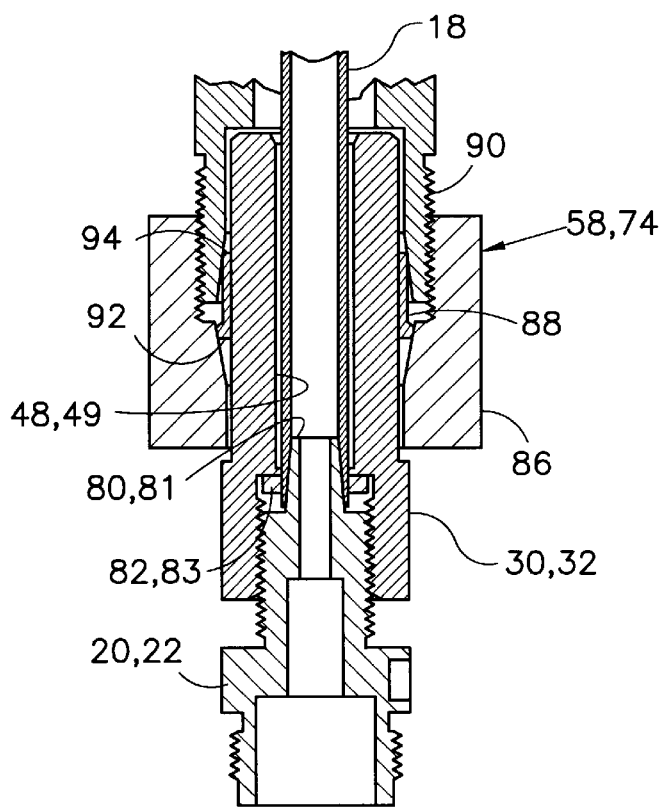
FIG. 2 is a section view showing a coupling nut and a compression fitting of the containment system shown in FIG. 1.

As best seen in FIG. 2, in the illustrated embodiment the fittings 20 and 22 are threaded compression type fittings which include conical nipples 80 and 81, respectively, and doughnut or washer shaped compression rings 82 and 83, respectively. When the coupling nuts 30 and 32 are threaded onto their respective fittings 20 and 22, the coupling nuts 30 and 32 engage their respective compression rings 82 and 83 which then forces the respective ends of the discharge tube 18 into engagement with the outside of the conical nipples 80 and 81. Further tightening of the compression nuts 30 and 32 onto the threads of their respective fittings 20 and 22 compresses the respective ends of the discharge tube 18 and the compression rings 82 and 83 between the conical nipples 80 and 81 and the coupling nuts 30 and 32, thereby sealing the ends of the discharge tube 18 in the fittings 20 and 22 to restrict leakage of the metered fluid.

While in the illustrated embodiment the fittings 20 and 22 are shown as compression fittings, it should be understood that each of the coupling nuts 30 and 32 can be configured to be compatible with any suitable type of fitting that is provided on the metering pump 14 or the conduit 16. Thus, by way of example without limitation, either of the nuts 30 and 32 could be configured to sealingly engage an end of the discharge tube 18 in a threaded flare fitting or an o-ring face-seal type fitting.

Figure 3:
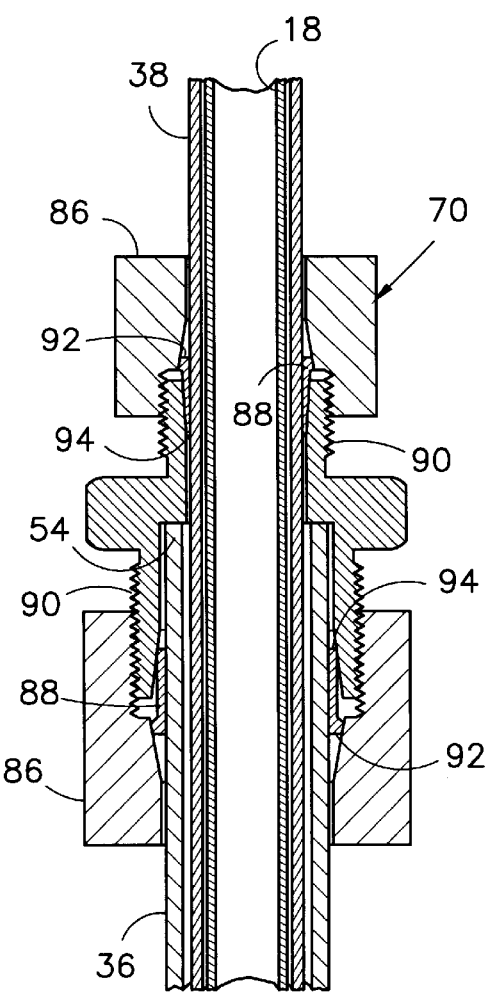
FIG. 3 is a section view showing a union and a pair of tubes of the containment system.

In the preferred embodiment, each of the fittings 58, 60, 62, 68, 70, 72 and 74 are suitable, commercially available, threaded compression type fittings of similar construction. Further, in the preferred embodiment, the unions 40 and 42 are identical. Accordingly, for purposes of illustrating a suitable compression type fitting, the description of each of the compression fittings 58, 60, 62, 70, 72 and 74 can be done with reference to the fitting 70 on the union 40, with the reference numbers for the components of the fitting 70 being used for the equivalent components of the other fittings in the drawings. As seen in FIG. 3, the fitting 70 includes a threaded nut 86 and a compression ring or sleeve 88. When the threaded nut is tightened onto the threads 90 of the fitting 70, the ends 92 and 94 of the compression ring 88 are compressed between the tube 38 and the fitting 70 to create a seal therebetween for restricting leakage of the metered fluid from the containment system 10.

To install the containment system 10, the end of the discharge tube 18 is engaged with the conical nipple 80 of the fitting 20 and the coupling nut 30 is threaded onto the fitting 20 to sealingly engaged the end of the discharge tube 18 in the fitting 20. The discharge tube 18 is then inserted through the fittings 58 and 60 and the Tee 34 is slid over the discharge tube 18 until the cylindrical body 46 of the coupling nut 30 is engaged in the fitting 58. The fitting 58 can then be tightened. Next, the tube 36 is slid over the discharge tube 18 until the end 50 is engaged in the fitting 60. The fitting 60 can then be tightened. The union 40 is then slid over the discharge tube 18 until the end 54 of the tube 36 is engaged in the fitting 68 and the fitting 68 is tightened. Next, the tube 38 is slid over the discharge tube 18, through the union 40 and into the tube 36, with the end 56 of the tube 38 extending out from the fitting 70. The union 42 is then slid over the discharge tube 18 until the end 56 of the tube 38 is engaged in the fitting 72. The free end of the discharge tube 18 is then engaged with the conical nipple 81 of the fitting 22 and the coupling nut 32 is tightened on the fitting 22 to sealingly engage the end of the discharge tube 18 in the fitting 22. The union 42 is then slid along the discharge tube 18 until the cylindrical body 48 of the coupling nut 32 is engaged in the fitting 74, which can then be tightened to sealingly engage the body 48. The tube 38 is then slid over the discharge tube 18 until the end 56 is again engaged in the fitting 72, which then can be tightened to sealingly engage the end 56. The fitting 70 is then tightened to sealingly engage the tube 38. The end 64 of the drain line 44 can be inserted into the fitting 62 at any time and the fitting 62 tightened to sealingly engage the end 64 therein. In the illustrated embodiment, the other end of the drain line 44 is inserted into a port in the tank 15.

In the event of a failure, such as a rupture, in the discharge tube 18, the containment system 10 will direct any metered fluid that leaks from the discharge tube 18 into the Tee 34 so that it can be returned to the supply tank 15 via the drain port 62 and the drain tube 44.

The components 30, 32, 34, 36, 38, 40, 42 and 44 may be made of any suitable material for the particular chemical addition system 12 in which the containment system 10 is used. In one embodiment, each of the components 30, 32, 34, 40 and 42 are polypropylene, and the tubes 36, 38 and 44 are polyethylene. Similarly, the components of the containment system may be of any size that is compatible with the particular discharge tube 18 and fittings 20 and 22 of the chemical addition system 12 in which the containment system 10 is to be installed. In one embodiment that is compatible with discharge tubes 18 having either ¼" or ⅜" outside diameters, the tube 36 has a ⅞" outside diameter with a ¹⁄₁₆" wall, the tubes 38 and 44 have ⅝" outside diameters with ¹⁄₁₆" walls, the cylindrical bodies 46 and 48 have ⅞" outside diameters, each of the fittings 58, 60, 68 and 74 are ⅞" fittings, and the fittings 70 and 72 are ⅝" fittings. In one embodiment it has been found that a two foot length for the tube 36 allows for a reasonable amount of adjustment in the length of the containment system 10 for adaptability and ease of assembly with a large variety of chemical addition systems 12. A fixed length of the tube 38 can be provided with the system 10, or the tube 38 can be cut to a suitable length for the particular chemical addition system 12. In this regard, great precision is not required in cutting the length of the tube 38 because of the adjustability of the system 10.

While in the preferred embodiment all of the fittings 58, 60, 62, 68, 70, 72 and 74 are of the compression type, it should be understood that the use of a compression type fitting is only necessary for the fitting 70 to allow for the telescoping of the tube 38 in the tube 36 for adjusting the length of the containment system 10. In some applications, it may be desirable for one or more of the remaining fittings, 58, 60, 62, 68, 72 and 74 to be of a type other than compression. Further, while the outside diameters of the cylindrical bodies 46 and 48 and the tube 36 are preferably the same, in some applications, it may be desirable for the outside diameter one or more of these components to be different from the outside diameters of the others. In such applications, it follows that the respective fittings 58, 74, 60 and 68 would be of a compatible size. It should also be understood that while it is preferred that the unions 40 and 42 be identical, in some applications it may be desirable for the unions 40 and 42 not to be identical. Finally, it should be understood that while the fitting 62 and drain tube 44 are preferred, it may be desirable in some applications to utilize other types of drain ports and conduits for draining fluid from the containment system 10.

By providing adjustments in length, the containment system 10 can be adapted to and assembled with a variety of chemical addition systems.

What is claimed is:

1. A containment system for use with the discharge tube of a metering pump, the discharge tube having a first end engaged in a first fitting on the metering pump and a second end engaged in a second fitting, the containment system comprising:

a first coupling nut configured to sealingly engage the first end of the discharge tube in the first fitting, the first coupling nut having an opening sized to allow the discharge tube to extend therethrough to engage the first fitting;

a connector having third and fourth fittings sized to allow the discharge tube to extend therethrough, the third fitting configured to sealingly engage a portion of the first coupling nut, the connector further including a drain port;

a first tube having third and fourth ends, the third end configured to be sealingly engaged in the fourth fitting, the first tube sized to allow the discharge tube to extend therethrough;

a first union having sixth and seventh fittings sized to allow the discharge tube to extend therethrough, the sixth fitting configured to sealingly engage the fourth end, the seventh fitting being a compression type fitting;

a second tube having fifth and sixth ends, the fifth end sized to extend through the sixth and seventh fittings and into the first tube, the second tube sized to be sealingly engaged in the seventh fitting and to allow the discharge tube to extend through the second tube;

a second union having eighth and ninth fittings sized to allow the discharge tube to extended therethrough, the eighth fitting configured to sealingly engage the sixth end of the second tube, and a second coupling nut configured to sealingly engage the second end of the discharge tube in the second fitting, the second coupling nut having a portion configured to be sealingly engaged in the ninth fitting, the second coupling nut having an opening sized to allow the discharge tube to extend therethrough to engage the second fitting.

2. The containment system of claim 1 wherein the third, fourth, sixth, eighth, and ninth fittings are of the compression type.

3. The containment system of claim 1 wherein the connector is a tee and the drain port is a compression type fitting, and the containment system further comprises a drain tube having, an end sized to be sealingly engaged in said drain port.

4. The containment system of claim 1 wherein the third and ninth fittings are of the compression type, the first coupling nut comprises a cylindrical body sized to be sealingly engaged in the third fitting, and the second coupling nut comprises a cylindrical body sized to be sealingly engaged in the ninth fitting.

5. The containment system of claim 1 wherein the third and fourth fittings are coaxial.

6. A containment system for use with the discharge tube of a metering pump, the discharge tube having a first end engaged in a first fitting on the metering pump and a second end engaged in a second fitting, the containment system comprising:

a first coupling nut configured to sealingly engage the first end of the discharge tube in the first fitting, the first coupling nut having a cylindrical body with an opening extending therethrough, the opening sized to allow the discharge tube to extend therethrough to engage the first fitting;

a connector having third and fourth fittings of the compression type, the third fitting sized to a sealingly engage the cylindrical body of the first coupling nut, the third and fourth fittings sized to allow the discharge tube to extend therethrough, the connector further comprising a drain port;

a first tube having third and fourth ends, the third end sized to be sealingly engaged in the fourth fitting, the first tube sized to allow the discharge tube to extend therethrough;

a first union having sixth and seventh fittings of the compression type, the sixth fitting sized to sealingly engage the fourth end of the first tube, the sixth and seventh fittings sized to allow the discharge tube to extend therethrough;

a second tube having fifth and sixth ends, the fifth end sized to extend through the sixth and seventh fittings and into the first tube, the second tube sized to be sealingly engaged in the seventh fitting and to allow the discharge tube to extend through the second tube;

a second union having eighth and ninth fittings of the compression type, the eighth fitting sized to sealingly engage the sixth end of the second tube, the eighth and ninth fittings sized to allow the discharge tube to extended therethrough; and a second coupling nut configured to sealingly engage the second end of the discharge tube in the second fitting, the second coupling nut having a cylindrical body sized to be sealingly engaged in the ninth fitting, the cylindrical body having an opening sized to allow the discharge tube to extend therethrough to engage the second fitting.

7. The containment system of claim 6 wherein the connector is a tee and the drain port is a compression type fitting, and the containment system further comprises a drain tube having an end sized to be sealingly engaged in said drain port.

8. The containment system of claim 6 wherein the third and fourth fittings are coaxial.

9. A containment system for use with the discharge tube of a metering pump, the discharge tube having a first end engaged in a first fitting on the metering pump and a second end engaged in a second fitting, the containment system comprising:

a first coupling nut in threaded engagement with the first fitting to sealingly engage the first end of the discharge tube in the first fitting, the first coupling nut having a cylindrical body with an opening extending therethrough, the discharge tube extending through the opening in the cylindrical body;

a connector having third and fourth fittings of the compression type, the cylindrical body of the first coupling nut sealingly engaged in the third fitting, the discharge tube extending through the third and fourth fittings, the connector further comprising a drain port;

a first tube having third and fourth ends, the third end sealingly engaged in the fourth fitting, the discharge tube extending through the first tube;

a first union having sixth and seventh fittings of the compression type, the fourth end sealingly engaged in the sixth fitting, the discharge tube extending through the sixth and seventh fittings;

a second tube having fifth and sixth ends, the fifth end sized to extend through the sixth and seventh fittings and into the first tube, the second tube sealingly engaged in the seventh fitting, the discharge tube extending through the second tube;

a second union having eighth and ninth fittings of the compression type, the sixth end of the second tube sealingly engaged in the eighth fitting, the discharge tube extending through the eighth and ninth fittings; and a second coupling nut in threaded engagement with the second fitting to sealingly engage the second end of the discharge tube in the second fitting, the second coupling nut having a cylindrical body sealingly engaged in the ninth fitting, the discharge tube extending through an opening in the cylindrical body of the second coupling nut to engage the second fitting.

10. The containment system of claim 6 wherein the connector is a tee, the third and fourth ports are coaxial, the drain port is a compression type fitting; and the containment system further comprises a drain tube having an end sized to be sealingly engaged in said drain port.

* * * * *